United States Patent [19]

Kim

[11] Patent Number: 6,094,514
[45] Date of Patent: Jul. 25, 2000

[54] GAIN MEASURING APPARATUS OF A MULTI-CHANNEL OPTICAL FIBER AMPLIFIER

[75] Inventor: Jeong-mee Kim, Sungnam, Rep. of Korea

[73] Assignee: SamSung Electronics Co., Ltd., Suwon, Rep. of Korea

[21] Appl. No.: 09/133,371

[22] Filed: Aug. 13, 1998

[30] Foreign Application Priority Data

Aug. 13, 1997 [KR] Rep. of Korea .................. 97-38692

[51] Int. Cl.[7] ............................... G02B 6/28; G02B 6/35
[52] U.S. Cl. ................... 385/27; 385/24; 359/128
[58] Field of Search .................. 385/27, 24; 370/534, 370/535, 537, 542; 359/128

[56] References Cited

U.S. PATENT DOCUMENTS 5,223,705   6/1993   Aspell et al. ........................ 250/225
5,781,322   7/1998   Uchimaya et al. .................... 359/161

*Primary Examiner*—Jon Henry
*Attorney, Agent, or Firm*—Robert E. Bushnell, Esq.

[57] ABSTRACT

A gain measuring apparatus of a multi-channel optical fiber amplifier for amplifying an input multi-channel optical signal of a predetermined wavelength range includes a plurality of optical signal sources for generating an optical signal, the number of optical signal sources being less than the number of channels of the multi-channel optical signal, in a wavelength range of the multi-channel optical signal, a probe optical signal source for generating a probe signal of a wavelength of which gain is subject to measurement, an optical multiplexer for multiplexing optical signals output from the optical signal sources and the probe optical signal source, an optical amplification portion for splitting the optical signals multiplexed by the optical multiplexer in an equal ratio and passing one optical signal of the split optical signal with amplification and the other optical signal of the split optical signal without amplification, and a measuring system for respectively measuring intensities of the amplified probe optical signal at the optical amplification portion and the probe optical signal that is not amplified at the optical amplification portion. When the gain of multi-channel erbium doped fiber amplifier is measured, the signal gain of each channel can be accurately measured using less optical signal sources than the number of light sources corresponding to each channel.

10 Claims, 2 Drawing Sheets

GAIN MEASURING APPARATUS OF A MULTI-CHANNEL OPTICAL FIBER AMPLIFIER

CLAIM OF PRIORITY

This application makes reference to, incorporates the same herein, and claims all benefits accruing under 35 U.S.C § 119 from an application entitled Gain Measuring Apparatus of Multi-Channel Optical Fiber Amplifier earlier filed in the Korean Industrial Property Office on Aug. 13, 1997, and there duly assigned Ser. No. 97-38692 by that Office.

FIELD OF THE INVENTION

The present invention relates to a gain measuring apparatus of a multi-channel optical fiber amplifier.

BACKGROUND OF THE INVENTION

In typical wavelength division multiplexing (WDM) communications, multi-channel optical signals are simultaneously transmitted through a single optical line. When the optical signals are transmitted over several hundred kilometers, loss is generated every several tens of kilometers. Thus, optical amplifiers should be installed at intermediary positions on the line to compensate for the loss.

To measure gains of multitude channels of a WDM erbium doped fiber amplifier (EDFA) which is used as optical fiber for WDM, source channels are necessary to input optical signals of each channel. For example, to measure gain of an EDFA with respect to an 8-channel optical signal, eight units of signal sources and a measurement system capable of detecting the optical signal are required. It is difficult, however, to provide all the necessary sources and it becomes expensive to do so.

SUMMARY OF THE INVENTION

To solve the above problem, it is an objective of the present invention to provide a gain measuring apparatus of a multi-channel optical fiber amplifier which multiplexes a predetermined number of optical signals having a wavelength selected from a signal wavelength area of multichannel and a probe optical signal, and measures gain for the tuned wavelength of a probe signal, so that a gain of a signal with respect to wavelength of each channel is measured.

Accordingly, to achieve the above objective, there is provided a gain measuring apparatus of a multi-channel optical fiber amplifier for amplifying an input multi-channel optical signal of a predetermined wavelength range which includes a plurality of optical signal sources for generating an optical signal, the number of optical signal sources being less than the number of channels of the multi-channel optical signal, in a wavelength range of the multi-channel optical signal, a probe optical signal source for generating a probe signal of a wavelength of which gain is subject to measurement, an optical multiplexer for multiplexing optical signals output from the optical signal sources and the probe optical signal source, an optical amplification portion for splitting the optical signals multiplexed by the optical multiplexer in an equal ratio and passing one optical signal of the split optical signal with amplification and the other optical signal of the split optical signal without amplification, and a measuring system for respectively measuring intensities of the amplified probe optical signal at the optical amplification portion and the probe optical signal that is not amplified at the optical amplification portion.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
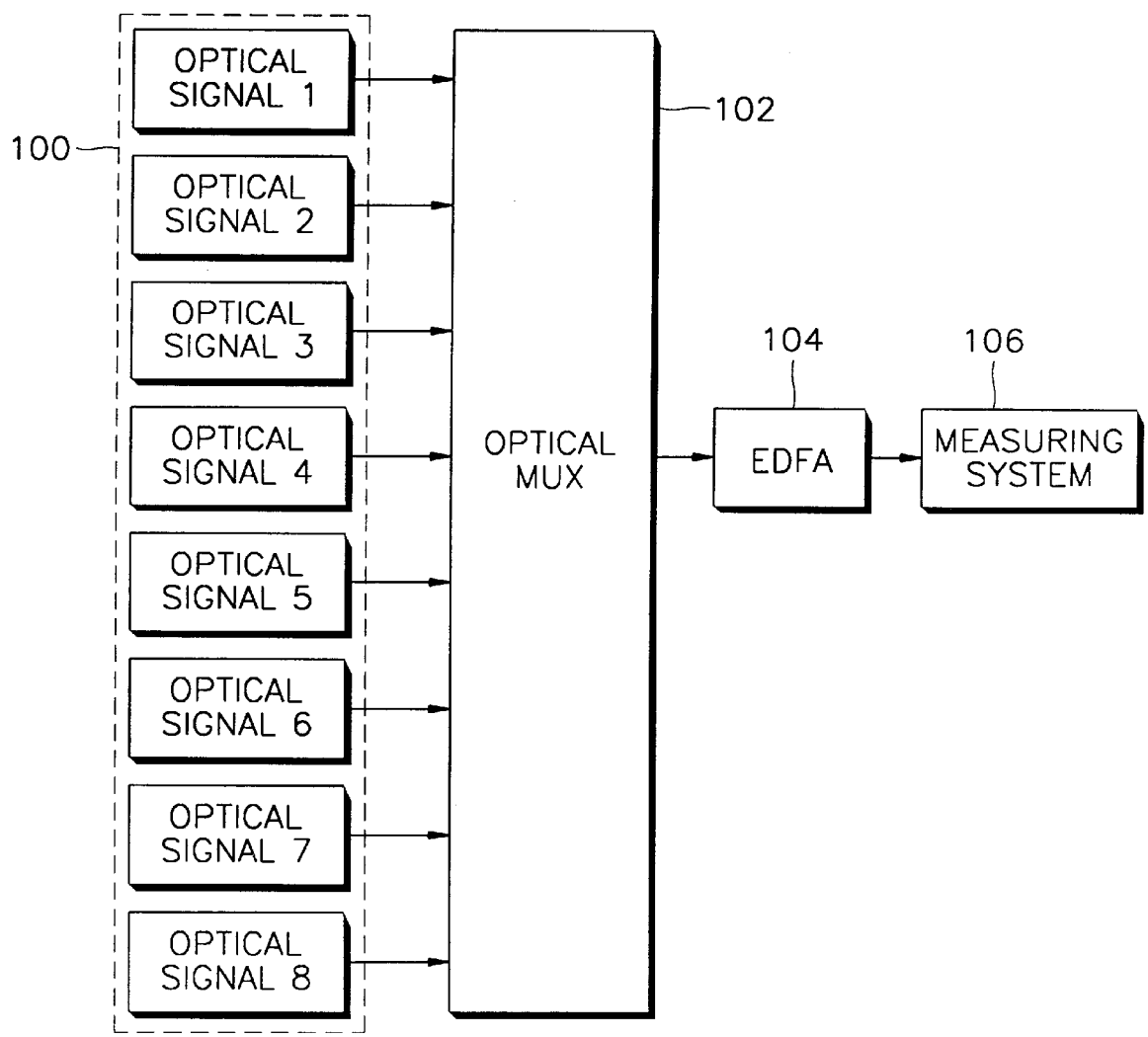
FIG. 1 is a block diagram showing an example of a gain measuring apparatus of EDFA for an 8 channel optical signal as contemplated by the inventor.

FIG. 1 shows an EDFA gain measuring apparatus with respect to an 8-channel optical signal. The EDFA gain measuring apparatus shown in FIG. 1 includes eight optical signals 100, an optical multiplexer 102, an EDFA 104 and a measuring system 106.

First, optical signals output from the eight optical signals 100 and having different wavelengths are multiplexed by optical multiplexer 102 and then amplified by EDFA 104. Here, intensities of the multiplexed eight optical signals prior to amplification by EDFA 104 and the intensities of the amplified eight optical signals, i.e., the multiplexed eight optical signals after amplification by EDFA 104, are measured by measuring system 106 for each wavelength. Signal gain and noise values are obtained from the above measured intensity values and amplified spontaneous emission (ASE) output from EDFA 104.

However, to measure gain of the EDFA 104 using the eight, i.e., multi-channel, optical signals, numerous signal sources are needed. As the number of channels increase from 4 to 8, 16, or 32, the number of signal sources need to be increased as well. Also, when the gain of the EDFA 104 is measured by changing the channel interval between the optical signals from 0.8 nm to 1.6 nm, it is necessary to change the signal sources into signal sources of desired wavelengths according to the channel interval. When the gain of the EDFA 104 with respect to multi-channel optical signals of the same number is measured, all signal sources must be changed as the band of wavelength changes. Also, in measuring system 106 for measuring the gain of a multi-channel EDFA, the number of channels must increase according to the number of channels of the optical signals in order to detect the signals.

Figure 2:
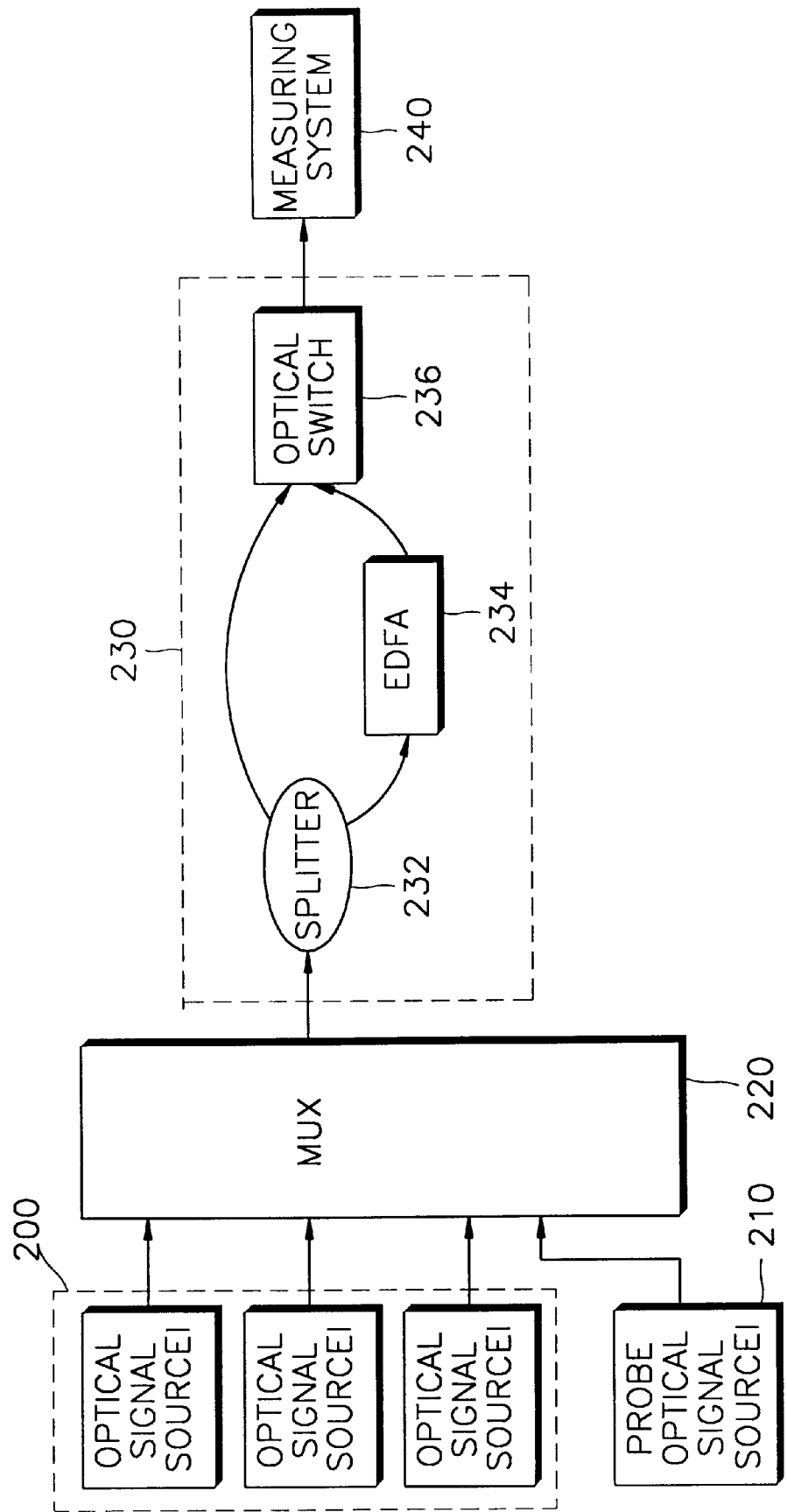
FIG. 2 is a block diagram showing a gain measuring apparatus of a multi-channel EDFA according to the principles of the present invention.

Referring to FIG. 2, a gain measuring apparatus of a multi-channel EDFA includes a predetermined optical signal source 200, a probe optical signal source 210, an optical multiplexer 220 for multiplexing an output optical signal of predetermined optical signal source 200 and an output optical signal of probe optical signal source 210, an optical amplification portion 230 for amplifying an output optical signal of optical multiplexer 220, and a measuring system 240 for measuring intensities of the probe optical signal amplified by optical amplification portion 230 and the unamplified probe optical signal.

The optical amplification portion 230 is comprised of a splitter 232 for splitting the output optical signal of optical multiplexer 220 in a 50:50 ratio, an EDFA 234 for amplifying an output optical signal from one end of splitter 232, and an optical switch 236 for selectively outputting an optical signal of the output optical signal of EDFA 234 and an output optical signal from the other end of splitter 232.

The operation of a gain measuring apparatus of a multichannel EDFA of the present invention will be described.

First, when an input multi-channel optical signal has 8 channels, for example, optical signal source 200 generates 3 or 4 optical signals of different wavelengths. Here, the wavelengths of the generated optical signals are within a wavelength range of the input multi-channel optical signal and the intensities of the overall optical signal sources are the same as that of the input multi-channel optical signal. Optical multiplexer 220 multiplexes the optical signals generated by optical signal source 200 and the probe optical signal generated by probe optical signal source 210. Here, the wavelength and intensity of the probe optical signal generated by probe optical signal source 210 are tunable. The multiplexed optical signal is input to splitter 232 of optical amplification portion 230 and splitter 232 splits the multiplexed optical signal in a 50:50 ratio. One of the split optical signals is amplified at EDFA 234. Here, the intensity of the probe optical signal is approximately −35 dBm, a degree of not affecting population inversion of EDFA 234 and the wavelength of the probe optical signal is tuned to be within a signal wavelength range. Optical switch 236 selects one between the amplified signal and the output optical signal of the port not connected to EDFA 234 of splitter 232. The wavelength and intensity of the probe optical signal selected by optical switch 236 are measured by measuring system 240, such as an optical spectrum analyzer. That is, the measurement of the gain of the probe optical signal is made by comparing the intensity of the probe optical signal output from an end of the splitter 232 not connected to EDFA 234 and input to measuring system 240 through optical switch 236 with the intensity of the probe optical signal amplified by EDFA 234 and input to measuring system 240 through optical switch 236.

The gain of the probe optical signal measured as above for each wavelength of the optical signal input to EDFA 234 is the gain for each channel of the multi-channel optical signals input to EDFA 234.

As described above, according to the present invention, when the gain of a multi-channel EDFA is measured, the signal gain of each channel can be accurately measured using less optical signal sources than the number of light sources corresponding to each channel. Also, if an input wavelength of each channel is given, regardless of the number of signal channels and the channel interval, the gain with respect to each channel of the multi-channel EDFA can be obtained.

What is claimed is:

1. A gain measuring apparatus of a multi-channel optical fiber amplifier for amplifying an input multi-channel optical signal of a predetermined wavelength range, said apparatus comprising:

a plurality of optical signal sources for generating a multi-channel optical signal, the number of optical signal sources being less than the number of channels of said multi-channel optical signal, in a wavelength range of said multi-channel optical signal;

a probe optical signal source for generating a probe optical signal of a wavelength of which gain is subject to measurement;

an optical multiplexer for multiplexing optical signals output from said plurality of optical signal sources and said probe optical signal source;

an optical amplification portion for splitting the optical signals multiplexed by said optical multiplexer in an equal ratio and passing one optical signal of the split optical signal with amplification and the other optical signal of the split optical signal without amplification; and a measuring system for respectively measuring intensities of the probe optical signal amplified at said optical amplification portion and the probe optical signal that is not amplified at said optical amplification portion.

2. The apparatus as claimed in claim 1, wherein said optical signal sources generate optical signals having different wavelengths from each other.

3. The apparatus as claimed in claim 2, wherein said optical signal sources generate optical signals of which overall intensity of said optical signal sources are the same as an intensity of said input multi-channel optical signal.

4. The apparatus as claimed in claim 1, wherein said optical amplification portion comprises:

a splitter for splitting an output optical signal of said optical multiplexer in said equal ratio;

a multi-channel erbium doped fiber amplifier for amplifying one optical signal output from said splitter; and an optical switch for outputting one among the output optical signal of said erbium doped fiber amplifier and the other optical signal output from said splitter.

5. The apparatus as claimed in claim 1, wherein said probe optical signal source generates an optical signal having an intensity and wavelength which are tunable by a user.

6. The apparatus as claimed in claim 5, wherein said probe optical signal source outputs an optical signal which has an intensity so as not to affect a population inversion of said multi-channel erbium doped fiber amplifier.

7. A gain measuring apparatus of a multi-channel optical fiber amplifier for amplifying an input multi-channel optical signal of a predetermined wavelength range, said apparatus comprising:

a plurality of optical signal sources for generating a plurality of optical signals;

a probe optical signal source for generating a probe optical signal;

an optical multiplexer for outputting a multi-channel optical signal by multiplexing said plurality of optical signals output and said probe optical signal;

a splitter for receiving said multi-channel optical signal output from said optical multiplexer and for outputting said multi-channel optical signal via first and second output ports;

a multi-channel erbium doped fiber amplifier for generating an amplified multi-channel optical signal by amplifying the multi-channel optical signal output from said first port of said splitter;

an optical switch connected to receive said multi-channel optical signal output from said second output port of said splitter and said amplified multi-channel optical signal of said multi-channel erbium doped fiber amplifier, said switch outputting said multi-channel optical signal and said amplified said multi-channel optical signal; and a measuring system for respectively measuring intensities of the probe optical signal portion of said amplified multi-channel optical signal and the probe optical signal portion of said multi-channel optical signal output from said second port of said splitter via said optical switch to obtain a gain of each channel of said multi-channel erbium doped fiber amplifier.

8. The apparatus as claimed in claim 7, wherein said probe optical signal source generates an optical signal having an intensity and wavelength which are tunable by a user.

9. The apparatus as claimed in claim 7, wherein said probe optical signal source outputs an optical signal which has an intensity so as not to affect a population inversion of said multi-channel erbium doped fiber amplifier.

10. A method of measuring gain of a multi-channel optical fiber amplifier for amplifying an input multi-channel optical signal of a predetermined wavelength range, said method comprising steps of:

generating a multi-channel signal including a probe optical signal;

splitting said multi-channel optical signal into a first multi-channel optical signal including said probe optical signal and a second multi-channel optical signal including said probe optical signal;

generating an amplified first multi-channel optical signal including an amplified probe optical signal by amplifying said first multi-channel optical signal using a multi-channel erbium doped fiber amplifier; and measuring an intensity of said amplified probe optical signal and an intensity of said probe signal of said second multi-channel optical signal to obtain a gain for each channel of said multi-channel erbium doped fiber amplifier.

* * * * *